Aug. 2, 1949.  W. F. FROCK  2,477,975
PULSATOR FOR MILKING MACHINES
Filed Sept. 19, 1947
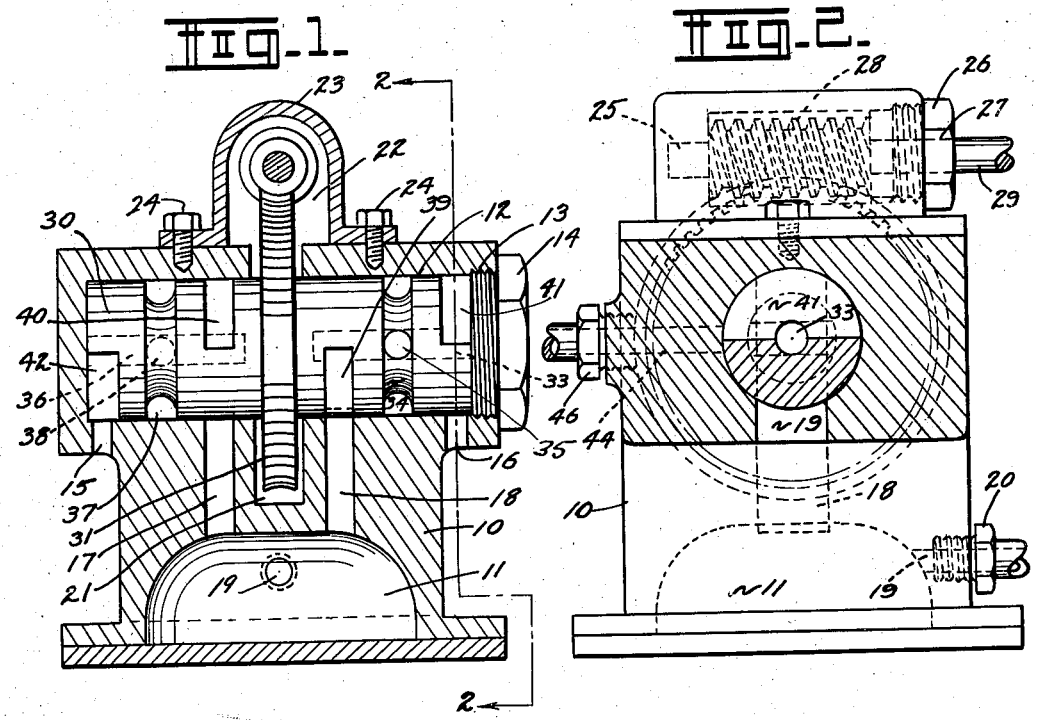
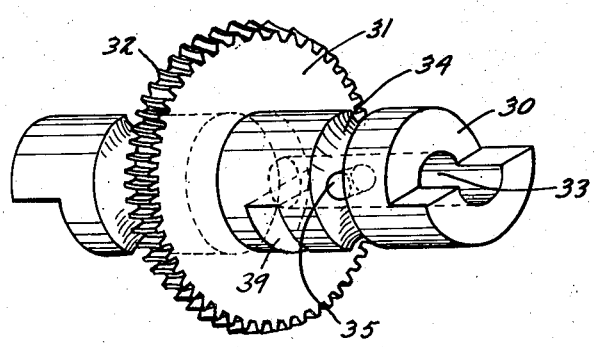
INVENTOR.
William F. Frock.
BY
ATTORNEY.

Patented Aug. 2, 1949

2,477,975

UNITED STATES PATENT OFFICE 2,477,975

PULSATOR FOR MILKING MACHINES

William F. Frock, North Jackson, Ohio

Application September 19, 1947, Serial No. 775,027

2 Claims. (Cl. 31—61)

This invention relates to milking machines and more particularly to mechanical pulsators for use therewith.

The principal object of the invention is the provision of a pulsator for a milking machine capable of equally timing pulsations in the vacuum line of the milking machine.

A further object of the invention is the provision of a pulsator for a milking machine comprising a novel mechanically actuated rotor valve.

A still further object of the invention is the provision of a pulsator for a milking machine adapted to be driven by a separate power source and to be independent in operation with respect to the milking machine.

A still further object of the invention is the provision of a pulsator for milking machines comprising a mechanically operated rotor valve and a suitable power source for rotating the same and controllable to vary the pulsation rate.

The pulsator for milking machines shown and described herein comprises a simple mechanical device which may be inexpensively formed and readily adapted to many and various types of vacuum actuated milking machines whereby controllable, equally timed pulsations of continuously even duration may be imparted to the vacuum lines of the milking machines thereby increasing the efficiency of the machine and rendering it free of dependence on the vacuum or pressure operated pulsators and the irregularities both as to timing and duration of pulsation.

The pulsator shown and described herein may be formed in conjunction with a suitable power source such as a small electric motor or independently thereof for operation by any electric motor or otherwise and includes only two moving parts and is capable of extremely long and satisfactory life.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a cross sectional side elevation of the pulsator.

Figure 2 is a cross section of the pulsator taken on line 2—2 of Figure 1.

Figure 3 is an enlarged perspective view of the rotor portion of the pulsator shown in Figures 1 and 2.

By referring to the drawings and Figures 1 and 2 in particular it will be seen that a pulsator for a milking machine has been disclosed which comprises a body 10 having a vacuum chamber 11 formed in the lower portion thereof and a transversely positioned tubular bore 12 formed in the upper portion thereof. The tubular bore 12 is open at one end and is internally threaded as at 13 for the reception of a threaded closure plug 14. Ports 15 and 16 communicate with the tubular bore 12 and with the atmosphere. Ports 17 and 18 communicate with the tubular bore 12 and with the vacuum chamber 11. An outlet orifice 19 in communication with the vacuum chamber 11 is provided at its outer most end with a fitting 20 by means of which communication with a suitable vacuum source (not shown) is obtained.

A vertical opening 21 is formed in the body member 10 and at right angles to the transverse bore 12 therein and midway between the ends thereof, the vertical opening 21 communicating with a chamber 22 on the upper surface of the body member 10 as defined by a closure 23 affixed to the body member 10 by means of cap screws 24. The closure 23 has a journal 25 formed in one end thereof and a threaded cap 26 closing the other end thereof which in turn has a journal 27 formed therein. A worm gear 28 is disposed within the closure 23 and carried upon the journals 25 and 27. A drive shaft extends outwardly through the journal 27 and is indicated by the numeral 29.

A rotor 30 is disposed within the transverse bore 12 and has an annular flange 31 formed midway between its ends, the periphery of the said annular flange 31 having a gear tooth pattern 32 thereon for registry with the worm gear 28. The rotor 30 extends an equal length on each side of the annular flange 31 and is of comparable construction on each side thereof. The construction of the rotor on the right hand side of the flange 31, as shown in Figures 1 and 3, includes an axially extending bore 33, an annular channel 34 and an opening 35 establishing communication between the annular channel 34 and the axially extending opening 33. The uppermost half of the outermost end portion of the rotor on the right hand side of the flange 31 is cut away, as best shown in Figure 3. The left hand side of the rotor 30 with respect to the annular flange 31 is arranged substantially similar with the right hand side with the exception that it is inverted. Thus, the lower half of the outermost end portion of the left hand end of the rotor 30 is cut away. The axially extending bore thereof is indicated by the numeral 36 and the annular channel therein is indicated by the numeral 37.

The communicating passageway between the axially extending bore 36 and the channel 37 is indicated by the numeral 38. Secondary communicating passageways 39 and 40 are formed in the rotor 30 one on each side of the annular flange 31 and in oppositely disposed relation to the half cut-away end sections heretofore referred to. The secondary passageways 39 and 40 communicate with the axially extending bores 33 and 36, respectively, and register alternately with the ports 18 and 17, respectively, when the rotor 30 revolves.

The half cut away end portions of the rotor heretofore referred to form chambers 41 and 42, respectively, which register alternately with the ports 16 and 15 when the rotor 30 revolves.

The body 10 of the pulsator has a pair of horizontally positioned passageways 43 and 44 which communicate with the tubular bore 12 at the annular channels 37 and 34 respectively and the exterior of the body 10 and with fittings 45 and 46 which are adapted to be placed in communication with the milking cups on the milking machine with which the device is connected. It will thus be seen that two sets of milking cups may be operated with the pulsator shown and described herein, the construction of the milking cups and the balance of the milking machine not being shown or otherwise described herein as the same are well known in the art.

The ports 17 and 18 are rectangular in cross section, as shown in Figures 1 and 2, so that an efficient valving action is obtained with respect to the vacuum source which comprises the chamber 11 in the lower portion of the body 10 as the same is in communication with a vacuum source such as a vacuum pump (not shown).

It will be obvious to those skilled in the art that when an electric motor or other suitable source is coupled to the shaft 28 and the worm gear revolved thereby at a predetermined speed, the rotor 30 will revolve in the tubular bore 12 of the body member 10 thereby bringing the secondary passageways 39 and 40 into alternate registry with the passageways 18 and 17, thus connecting the axial bores 33 and 36 with the vacuum chamber 11. As the axial bores 33 and 36 are in communication with the annular channels 34 and 37 by reason of the openings 35 and 38, the vacuum chamber 11 is thus directly connected with the horizontal passageways 43 and 44 and hence directly with the milking cups of the milking machine.

As the rotor 30 revolves, the rectangular formation of the vacuum conducting passageways 17 and 18 causes a sharp cut off valving action when the secondary openings 39 and 40 alternately rotate out of registry with the passageways 18 and 17, respectively, and simultaneously the chambers 41 and 42 (formed by the half cut away end sections of the rotor 30) alternately register with the ports 16 and 15, respectively, thus directly alternately connecting the milking cup lines 43 and 44 with the atmosphere therethrough as the chambers 41 and 42 are in communication with the axial bores 33 and 36 at all times.

It will thus be seen that uniform pulsations are created in the vacuum lines connecting the milking cups and the vacuum source and that these pulsations may be of predetermined frequency of approximately 96 per minute by the formation of the worm gear and gear teeth in the periphery of the annular flange 31 as compared with the rotating speed of the power source employed to drive the worm gear 28. Variance from the predetermined frequency of pulsations may be had by rheostat control of the motor employed so that the pulsator forms a flexible, economic and extremely simple mechanism ideally adapted for this purpose and meeting the several objects of the invention.

Having thus described my invention, what I claim is:

1. A mechanical pulsator for controlling communication between a vacuum source and a milking machine comprising, a valve body having a transverse bore therein and a valve element disposed in said transverse bore for rotary motion therein, means to rotate said element relative to said bore, and cap means registrable with said bore for closing the same, said valve body having a pair of passageways adapted for communication with a milking machine, said valve element having a pair of annular grooves registering with the said passageways and a pair of longitudinally extending passageways each of which is in communication with one of said annular grooves, the said valve body having a second pair of passageways in communication with a vacuum source, and said valve element having a pair of oppositely disposed, segmentally shaped openings in registry with the said second pair of passageways in the valve body, said valve body having a third pair of passageways in communication with the atmosphere, said valve element having oppositely disposed cut-away sections for intermittent registery therewith to control communication between the said last mentioned passageways and the longitudinally extending passageways in the said valve element, each of the said longitudinally extending passageways communicating with one of the cut-away portions of the valve element, one of the annular grooves therein and one of the segmentally shaped openings therein to provide alternate communication between a vacuum source and a milking machine and the atmosphere and a milking machine when said valve element is rotated.

2. A mechanical pulsator for use in controlling communication between a vacuum source and a milking machine comprising a body member having a vacuum chamber therein and a transverse bore in spaced relation to said vacuum chamber, a tubular valve element having a closed middle section rotatably positioned in the said bore, said body member having a pair of passageways communicating with the transverse bore and adapted for connection with a milking machine, a pair of vertical passageways communicating with the transverse bore and the vacuum chamber, a pair of secondary vertical passageways communicating with the transverse bore adjacent its ends, and the atmosphere, said tubular valve element having oppositely disposed, laterally spaced ports on either side of the said middle section, said ports being in communication with the interior of said valve element and adapted to register with the vertical passageways in the body member, said valve element also having an annular groove therein on opposite sides of the middle section between the said laterally spaced ports in continuous registry with the said first mentioned passageways in the body member, and the said valve element having bores therein each affording communication between the said grooves and the interior of the valve element whereby rotation of the said tubular valve element will alternately connect the said first mentioned pair of passageways in communication with a milking machine and with the said vertical vacuum and atmospheric communication passageways.

WILLIAM F. FROCK.

REFERENCES CITED

The following references are of record in the file of this patent:

UNITED STATES PATENTS

| Number | Name | Date |
|---|---|---|
| 1,010,204 | Umrath | Nov. 28, 1911 |
| 1,210,304 | Gilman | Dec. 26, 1916 |
| 1,447,007 | Barnebl, Jr. | Feb. 27, 1923 |
| 1,744,002 | Price | Jan. 14, 1930 |
| 1,949,875 | Persoons et al. | Mar. 6, 1934 |
| 2,039,958 | Hapgood | May 5, 1936 |
| 2,308,705 | Meredith et al. | Jan. 19, 1943 |